W. A. PRESTON & G. M. DUFFIE.
CENTRIFUGAL SEPARATOR.
APPLICATION FILED SEPT. 8, 1906.
955,355.
Patented Apr. 19, 1910.
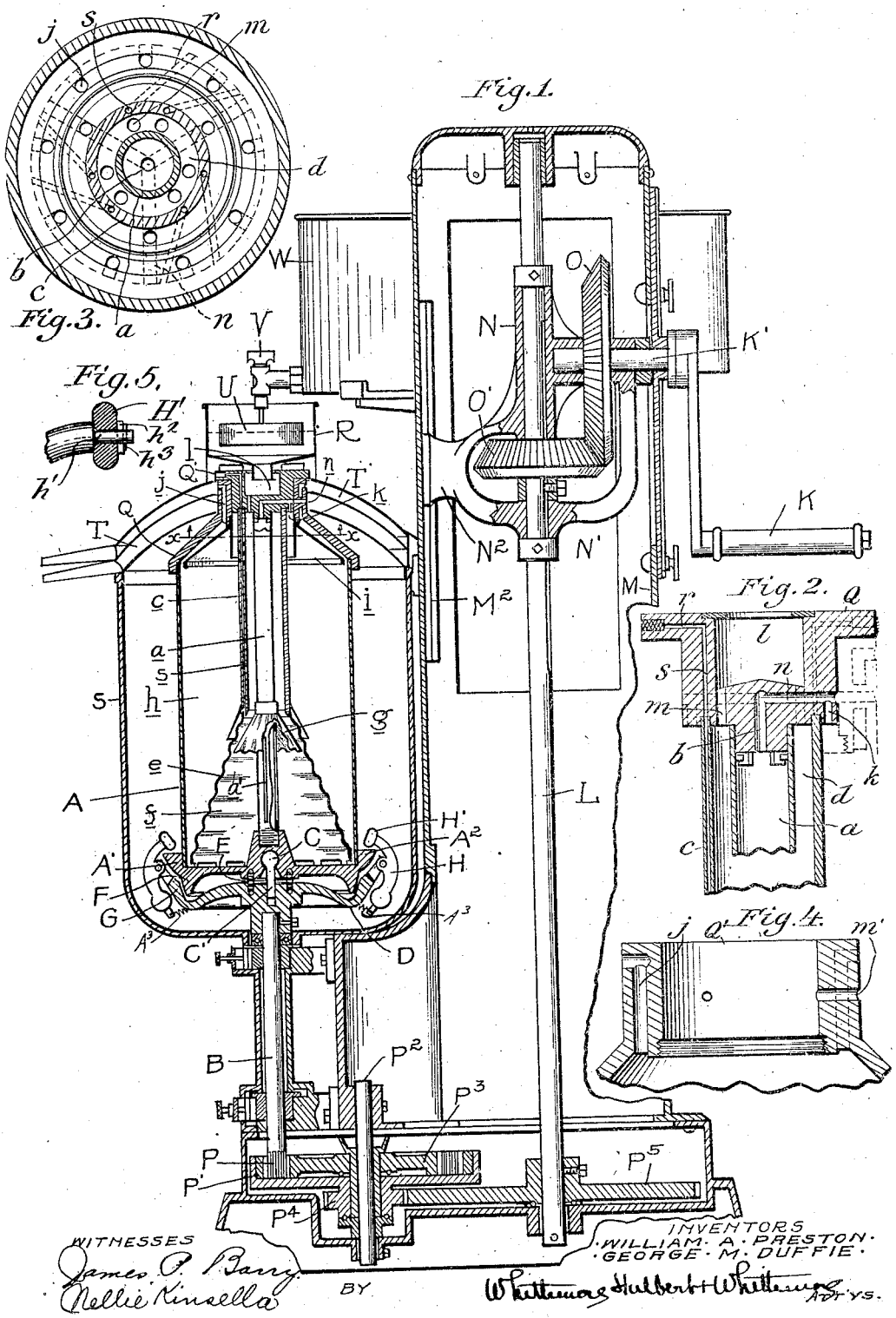
WITNESSES
James P. Barry
Nellie Kinsella
INVENTORS
WILLIAM A. PRESTON
GEORGE M. DUFFIE
BY Whittemore Hulbert & Whittemore
ATTYS.

UNITED STATES PATENT OFFICE.

WILLIAM A. PRESTON AND GEORGE M. DUFFIE, OF DETROIT, MICHIGAN.

CENTRIFUGAL SEPARATOR.

955,355.  Specification of Letters Patent.  Patented Apr. 19, 1910.

Application filed September 8, 1906. Serial No. 333,757.

*To all whom it may concern:*

Be it known that we, WILLIAM A. PRESTON and GEORGE M. DUFFIE, both citizens of the United States of America, residing at Detroit, in the county of Wayne and State of Michigan, have invented certain new and useful Improvements in Centrifugal Separators, of which the following is a specification, reference being had therein to the accompanying drawings.

The invention relates to centrifugal separators, more particularly designed for use in the separation of cream from full milk, and the invention consists in certain features of construction as hereinafter set forth.

In the drawings, Figure 1 is a vertical central section through the machine; Fig. 2 is an enlarged section of the central upper portion of the bowl; Fig. 3 is a horizontal section on line $x$—$x$, Fig. 1; Fig. 4 is an enlarged section illustrating the portion of the bowl surrounding that illustrated in Fig. 2; Fig. 5 is a detailed view of the anti-friction rolls for the weighted dogs or levers.

A is the bowl, which is automatically balanced, and B is a spindle upon which the bowl is mounted preferably by a ball and socket joint.

C is the ball member provided with a shank member C' slidably engaging a central aperture in the fitting D.

The socket with which the ball engages is formed in the bottom A' of the bowl.

E is a coiled spring arranged around the shank C' and between the bottom A' and the fitting D for yieldingly supporting the bowl. The ball and socket joint provides for independent revolubility of the bowl and spindle. Thus, in starting, by means of a slight frictional engagement, the bowl acquires the required velocity to find its true center. After the bowl has found its true balance it is coupled to the spindle by means of the clutches F and G respectively upon the bottom of the bowl and the fitting D.

H are weighted dogs or levers provided at their inner ends with anti-friction rolls H'. These rolls are journaled upon a bearing $h'$ preferably formed integral with the lever H and are held in place by a washer $h^2$ and pin $h^3$. The weighted dogs or levers H are normally held out of contact with the annular flange $A^2$ by means of springs $A^3$. These dogs are adapted to have their weighted ends thrown outward by centrifugal action, and when the required degree of velocity is attained to overcome the tension of the springs $A^3$, engage the annular flange $A^2$, overcome the tension of the springs E, and force the member F of the clutch into engagement with the member G.

For driving the spindle at the necessary speed we preferably employ a step-up gear train of which K is the actuating crank, K' the crank shaft and L the main drive shaft housed in the casing M.

N is a sleeve slidably mounted upon the shaft L and formed integral with the pocket N', which supports a bearing for the crank shaft K'.

$N^2$ is a projection on the pocket N' engaging the vertical guideways $M^2$ on the casing N.

O O' are intermeshing bevel gear wheels on the crank shaft K' and the shaft L respectively.

The step-up gear train between the shaft L and spindle B preferably comprises a pinion P on the spindle, engaging an internal gear wheel P' on the parallel stub axle $P^2$.

$P^3$ is an idler gear journaled on the stub axle, and also engaging the pinion P operating as a guide in steadying the movement of the internal gear wheel P'.

$P^4$ is a pinion secured to the gear wheel P' which meshes with a gear wheel $P^5$ on the main drive shaft L. Thus the rotation of the crank will drive the spindle at a greatly increased speed through the members of the gear train just described.

The construction of these parts, however, forms the subject matter of a separate invention, the present invention relating to improvements in the separating bowl.

The construction of the separating bowl is one designed with the object of effecting the separation with as little interference as possible between the initially separated skimmed milk and cream and the unseparated full milk.

One feature of the construction is the introduction of full milk into the bowl in a zone intermediate the separated cream and skimmed milk. This, in the construction illustrated, is accomplished by providing an inner tube $a$ extending from bottom to top of the bowl, and communicating at its upper end with the cream outlet passage $b$. Surrounding this inner tube, in the upper portion of the bowl, is a concentric tube $c$ thereby forming between the tubes an annular chamber $d$, through which the full milk may be introduced into the bowl. At the lower end of the outer tube $c$ is a conical wall or diaphragm $e$, which extends to near the bottom and periphery of the bowl. Within this member $e$ is a downwardly enlarged chamber $f$ in which the separation is first effected.

It will be observed that the full milk, which is introduced into the annular passage $d$ first enters the chamber $f$ in a zone intermediate the tube $a$ and the outer wall of the bowl. The distance from the center of this inner zone is preferably further increased by providing a flaring flange $g$ mounted upon the tube $a$ and arranged at the upper end of the chamber $f$. Thus, the full milk, when it finally enters the chamber $f$, is at the outer edge of the cream zone, and the cream separated from the milk is free to travel inward without interfering with the unseparated milk, or separated skimmed milk. On the other hand, the entrance into the bottom chamber of the full milk is immediately adjacent to the conical wall $e$, which wall divides the two chambers. This allows the skimmed milk, which is first separated, to travel downwardly along the inclined wall $e$ until, at the bottom of the inner bowl, it reaches the peripheral wall. Thus, the initial separation, in which the greater portion of the cream is extracted, is effected entirely within the chamber $f$, and with very little interference between the different portions of the milk. The cream thus separated passes through slits $a'$ in the tube $a$, and is forced upward through said tube to the outlet passage in its natural zone. The further skimming of the milk which passes outward along the conical wall $e$ is effected in the upper portion of the bowl, said milk passing around the lower end of the wall $e$, which is slightly spaced from both the bottom and the periphery of the bowl. In this upper chamber $h$, the cream still remaining with the milk is forced inward toward the tubular wall $c$ and before the upper end of the bowl is reached, practically all of the cream is thus separated. The skimmed milk then passes outside of the conical diaphragm $i$ in the space between the same and the outside cover of the bowl to the outlet passage $j$, while the cream enters an outlet passage $k$ at the upper end of the bowl adjacent to the tube $c$.

The inlet and outlet passages for both the milk and cream are preferably formed in heads $Q$ and $Q'$ at the upper end of the bowl. The head $Q$ is centrally recessed at $l$ to receive the full milk from a supply tank $R$.

$m$ are ports connecting the recess $l$ with the annular chamber $d$ between the tubes $a$ and $c$.

$n$ are passages extending from the central tube $a$ radially outward intermediate the ports $m$ and forming cream outlet passages.

$k$ are ports communicating with the passages $n$ and also with the upper end of the chamber $h$ which surrounds the tube $c$.

$j$ are passages formed in the head $Q'$ communicating with the space within the chamber $h$ above the diaphragm $i$ and having peripheral outlets.

Thus the full milk passes into the chamber $d$ and the cream from the separating chamber $f$ is combined with that separated in the chamber $h$, and passes out through the passages $n$, while the skimmed milk passes out through the passages $j$.

The bowl $A$ is preferably housed in a suitable casing $S$ at the upper end of which are arranged the cream and milk collecting pans $T$ and $T'$.

$U$ is a float in the receptacle $R$ for controlling and maintaining practically constant the level of the milk therein, said float operating a valve controlled connection $V$ on a tank $W$, in which the full milk is first placed.

With the construction described, the effort required in starting the separator is reduced to the minimum by the slippage between the spindle and the bowl. There is, however, enough frictional engagement to constantly accelerate the rotation of the bowl until centrifugal force will operate the dog $H$ and completely couple the bowl and spindle. In the meantime, as has been described, the bowl will find its true center of rotation.

In separators, where there is a continuous inflow and outflow of material, the outlets are arranged at greater distance from the axis of the bowl than the inlet passage, so that centrifugal action compels the outflow. With our improved construction, we have provided means for propelling the outflow of the milk and cream without regard to the location of their outlets, with respect to the axis. For this purpose, a current of air is introduced into the milk, and especially into the cream within the bowl, so as to commingle with the fluid, and assist in propelling it in its passages from the bowl. In Figs. 2 and 3 this is illustrated, a series of air passages $r$ being formed in the member $Q$ extending inward from the periphery obliquely to a radial line, and connecting with vertical passages $s$ leading to the chamber $f$ within the bowl. On account of the inclination of the passages $r$ to the radial lines, the rapid rotation of the bowl will create an air current, entering the passage $r$ and passing downward into the bowl. This will introduce bubbles of air into the milk, which will be forced inward with the cream, and will assist in propelling the latter outward through the central tube *a*. Furthermore, the passage of air bubbles inward through the fluid in the bowl will assist in the more rapid separation. As a consequence, the capacity or efficiency of the separator is increased. Air is also preferably introduced into the chamber *h* for the same purpose.

What we claim as our invention is:

1. In a centrifugal separator, the combination with a bowl, of a central outlet tube extending axially thereof for the lighter of the separated material, a tube surrounding the outlet tube for receiving the full fluid to be separated, and means carried by said outlet tube for introducing the full fluid to be separated into the bowl in a zone intermediate the lighter and heavier of the separated constituent parts of said fluid.

2. In a centrifugal separator, a central tube for the lighter of the separated material, a surrounding tube for receiving the full fluid to be separated, and a flaring wall extending from said surrounding tube forming an expanding separating chamber.

3. In a centrifugal separator, the combination of a bowl, a central tube for the lighter of the separated products, a surrounding tube forming a passage for the introduction of the full fluid, a flaring wall extending from said surrounding tube dividing the space within the bowl into a chamber expanding toward the lower end, and an upper chamber communicating therewith at the periphery of the bowl.

4. In a centrifugal separator, a bowl, a flaring divisional wall within the bowl dividing the same into a primary and secondary separating chamber, a central outlet for the lighter of the separated products from said primary chamber, an outlet from the inner zone of said secondary separating chamber, and a common discharge passage to which both of said outlets are connected.

5. In a centrifugal separator, the combination with a bowl, of an air conduit leading downward into the fluid within the bowl, and means operated by the rotation of the bowl for propelling air downward through said conduit, for the purpose described.

6. In a centrifugal separator, the combination with a bowl, of a central outlet tube extending axially thereof for the lighter of the separated material, and means carried by said tube for preventing the commingling of the incoming full fluid with the lighter of the outgoing material.

7. In a centrifugal separator, the combination with a bowl, of a central outlet tube extending axially thereof for the lighter of the separated material, a tube surrounding the outlet tube for receiving the full fluid to be separated, and means carried by said outlet tube for preventing the commingling of the incoming full fluid with the lighter of the outgoing material.

8. In a centrifugal separator, the combination with a bowl, of a central outlet tube for the lighter of the separated material extending axially thereof, a tube surrounding the outlet tube for receiving the full fluid to be separated, a flaring wall extending from said surrounding tube forming an expanding chamber, and a flaring portion on said outlet tube for preventing the commingling of the incoming full fluid with the lighter of the outgoing material.

9. In a centrifugal separator, the combination with a bowl, of a central outlet tube extending axially thereof for the lighter of the separated material, a tube surrounding the outlet tube for receiving the full fluid to be separated and means carried by the outlet tube for preventing the commingling of the incoming full fluid with the lighter of the outgoing material.

10. In a centrifugal separator, the combination with a bowl, of a central outlet tube extending axially thereof for the lighter of the separated material, a tube surrounding the outlet tube for receiving the full fluid to be separated, and a cone shaped member carried by the outlet tube for preventing the commingling of the incoming full fluid with the lighter of the outgoing material.

11. In a centrifugal separator, the combination with the bowl, of a hollow member within said bowl for receiving the lighter of the separated products, and means for introducing the full fluid outside of and adjacent to said hollow member.

12. In a centrifugal separator, the combination with the bowl, of a hollow member within the bowl surrounding the zone for the lighter of the separated products, a discharge conduit connecting with the space within said hollow member, and means for introducing the full fluid into the bowl outside of and adjacent to said hollow member.

13. In a centrifugal separator, the combination with a bowl, of a hollow member arranged within said bowl forming a baffle between the incoming full fluid and the lighter of the separated products.

In testimony whereof we affix our signatures in presence of two witnesses.

WM. A. PRESTON.
GEORGE M. DUFFIE.

Witnesses:
JAMES P. BARRY,
NELLIE KINSELLA.